US009156550B2

(12) United States Patent
Nam

(10) Patent No.: US 9,156,550 B2
(45) Date of Patent: Oct. 13, 2015

(54) DUAL CHANNEL WING FOR AN AEROCAR

(71) Applicant: Toyota Motor Engineering & Manufacturing North America, Inc., Erlanger, KY (US)

(72) Inventor: Taewoo Nam, Ann Arbor, MI (US)

(73) Assignee: Toyota Motor Engineering & Manufacturing North America, Inc., Erlanger, KY (US)

( * ) Notice: Subject to any disclaimer, the term of this patent is extended or adjusted under 35 U.S.C. 154(b) by 56 days.

(21) Appl. No.: 14/180,614

(22) Filed: Feb. 14, 2014

(65) Prior Publication Data
US 2015/0232180 A1 Aug. 20, 2015

(51) Int. Cl.
| B64C 39/06 | (2006.01) |
| B64C 37/00 | (2006.01) |
| B64C 3/00 | (2006.01) |
| B64C 21/04 | (2006.01) |
| B64C 3/32 | (2006.01) |
| B64C 11/00 | (2006.01) |
| B64C 3/56 | (2006.01) |
| B64C 39/00 | (2006.01) |

(52) U.S. Cl.
CPC . B64C 37/00 (2013.01); B64C 3/00 (2013.01); B64C 3/32 (2013.01); B64C 3/56 (2013.01); B64C 11/00 (2013.01); B64C 21/04 (2013.01); B64C 39/005 (2013.01); B64C 39/006 (2013.01); B64C 39/066 (2013.01)

(58) Field of Classification Search
CPC ........ B64C 37/00; B64C 3/56; B64C 39/066; B64C 3/10; B60F 5/02
See application file for complete search history.

(56) References Cited

U.S. PATENT DOCUMENTS

| 1,793,349 | A | * | 2/1931 | Andersson | 244/218 |
| 1,998,148 | A | * | 4/1935 | Vieriu | 244/49 |
| 2,011,254 | A | * | 8/1935 | Nightingale | 244/49 |
| 2,021,324 | A | * | 11/1935 | Osborn | 244/49 |
| 2,166,564 | A | * | 7/1939 | Pavlecka et al. | 244/49 |
| 2,290,850 | A | * | 7/1942 | Umschweif | 244/49 |
| 2,343,645 | A | * | 3/1944 | Dickinson et al. | 244/46 |
| 2,374,493 | A | * | 4/1945 | Moore | 244/48 |
| 2,424,556 | A | * | 7/1947 | Custer | 244/13 |
| 2,428,737 | A | * | 10/1947 | Crook et al. | 244/198 |
| 2,437,684 | A | | 3/1948 | Custer | |
| 2,476,482 | A | * | 7/1949 | Custer | 244/12.6 |
| 2,510,959 | A | * | 6/1950 | Custer | 244/12.6 |
| 2,514,478 | A | * | 7/1950 | Custer | 244/12.6 |
| 2,532,481 | A | * | 12/1950 | Custer | 244/12.6 |
| 2,532,482 | A | * | 12/1950 | Custer | 244/12.6 |
| 2,589,994 | A | * | 3/1952 | Custer | 244/35 R |
| 2,611,555 | A | * | 9/1952 | Custer | 244/12.6 |
| 2,611,556 | A | * | 9/1952 | Custer | 244/12.6 |

(Continued)

FOREIGN PATENT DOCUMENTS

FR 2591559 6/1987

Primary Examiner — Tien Dinh
Assistant Examiner — Michael A Fabula
(74) Attorney, Agent, or Firm — Christopher G. Darrow; Darrow Mustafa PC

(57) ABSTRACT

A dual channel wing for an aircraft, comprising an inboard and an outboard portion, wherein each portion comprises a channel wing section. Each channel may include a propulsor and the propulsors of each of the channels may be offset relative to one another in the chordwise direction of the wing. The wing may be foldable upon itself about a chordwise axis such that the inboard and outboard channels overlap. At least one dual channel wing may also be located on an aerocar.

20 Claims, 7 Drawing Sheets

(56) References Cited

U.S. PATENT DOCUMENTS

| | | | | |
|---|---|---|---|---|
| 2,665,083 A | * | 1/1954 | Custer | 244/12.6 |
| 2,674,422 A | * | 4/1954 | Pellarini | 244/49 |
| 2,687,262 A | * | 8/1954 | Custer | 244/12.6 |
| 2,691,494 A | * | 10/1954 | Custer | 244/12.6 |
| 2,693,920 A | * | 11/1954 | Taylor | 244/15 |
| 2,712,421 A | * | 7/1955 | Naumann | 244/49 |
| 2,961,188 A | | 1/1960 | Taylor | |
| 2,937,823 A | * | 5/1960 | Fletcher | 244/12.6 |
| 2,940,688 A | * | 6/1960 | Bland | 244/2 |
| 2,957,647 A | | 10/1960 | Shew | |
| 3,045,947 A | * | 7/1962 | Bertin et al. | 244/12.1 |
| 3,081,965 A | * | 3/1963 | Shew | 244/12.6 |
| 3,123,321 A | * | 3/1964 | Custer | 244/12.6 |
| 3,504,873 A | | 4/1970 | Spence | |
| 3,647,163 A | * | 3/1972 | Swwwney | 244/49 |
| 3,650,497 A | * | 3/1972 | Custer | 244/12.1 |
| 3,704,842 A | * | 12/1972 | Custer | 244/12.6 |
| 3,705,700 A | * | 12/1972 | Custer | 244/13 |
| 3,806,065 A | * | 4/1974 | Custer | 244/12.6 |
| 3,830,450 A | * | 8/1974 | Williams et al. | 244/207 |
| 4,463,920 A | * | 8/1984 | Nichols et al. | 244/207 |
| 4,627,585 A | * | 12/1986 | Einstein | 244/2 |
| 4,726,546 A | | 2/1988 | De Angelis | |
| 4,804,155 A | * | 2/1989 | Strumbos | 244/12.6 |
| 5,082,204 A | * | 1/1992 | Croston | 244/126 |
| 5,356,094 A | * | 10/1994 | Sylvain | 244/49 |
| 5,597,137 A | * | 1/1997 | Skoglun | 244/12.4 |
| 6,086,014 A | * | 7/2000 | Bragg, Jr. | 244/2 |
| 6,474,604 B1 | | 11/2002 | Carlow | |
| 6,619,584 B1 | * | 9/2003 | Haynes | 244/2 |
| 7,104,498 B2 | | 9/2006 | Englar et al. | |
| 7,938,358 B2 | * | 5/2011 | Dietrich et al. | 244/2 |
| 8,752,788 B2 | * | 6/2014 | Tuval | 244/34 A |
| 2003/0094536 A1 | * | 5/2003 | LaBiche | 244/2 |
| 2005/0029396 A1 | * | 2/2005 | Englar et al. | 244/12.6 |
| 2006/0202083 A1 | * | 9/2006 | Milde, Jr. | 244/12.6 |
| 2013/0193263 A1 | * | 8/2013 | Schweighart et al. | 244/2 |
| 2014/0014764 A1 | * | 1/2014 | Lundgren, Gert Magnus | 244/2 |

* cited by examiner

DUAL CHANNEL WING FOR AN AEROCAR

BACKGROUND

The present disclosure pertains to a vehicle that can be flown as a fixed wing aircraft and driven as a land vehicle; more specifically, the present disclosure is directed to a channel wing architecture therefor.

Flying has always been a dream central to the history of humanity. An aerocar or roadable aircraft is defined as a vehicle that may be driven on roads as well as takeoff, fly, and land as an aircraft. Vehicles that demonstrate such capability provide operators with freedom, comfort, and the ability to arrive quickly to a destination as mobility becomes three-dimensional yet remains private and personal. Such vehicles, however, may require various trade offs to facilities operations in the flight mode and the roadable mode.

Typically, a body of a land vehicle is relatively short to facilitate parking and road maneuverability, whereas a body of an aircraft is relatively long to facilitate flight stability and control authority. In one conventional roadable aircraft, each wing folds upward at a root and downward at a mid-span location to stow against the fuselage in the land mode. Although effective, the more numerous the fold locations, the greater the weight and complexity that necessarily influences operability in each mode. Further, such wing stowage may limit operator aft and side views conducive to effective operations in the road mode.

SUMMARY

An aerocar including a wing and methods for stowing and deploying the wing are disclosed. The wing can include two channels, an inboard channel and an outboard channel. The wing can stowed in a roadable mode within or against the aerocar by folding the outboard channel about a chord axis to stow the outboard channel atop the inboard channel and by folding the combination of the inboard channel and outboard channel about a wing axis to stow the entire wing. The wing can be deployed in a flight mode by reversing the folding process.

A wing according to one disclosed non-limiting embodiment of the present disclosure includes a dual channel wing with an outboard channel that extends spanwise from an inboard channel.

An aerocar according to another disclosed non-limiting embodiment of the present disclosure includes a dual channel wing with an outboard channel that extends spanwise from an inboard channel, wherein the outboard channel is defined about an outboard axis and the inboard channel is defined about an inboard axis; an outboard propulsor along the outboard axis; and an inboard propulsor along the inboard axis.

A method of stowing and deploying a wing according to another disclosed non-limiting embodiment of the present disclosure includes swinging an outboard channel about a chord axis such that the outboard channel stows atop an inboard channel; and swinging the wing about a wing axis such that the wing is foldable between a stowed roadable mode and a deployed flight mode.

The foregoing features and elements may be combined in various combinations without exclusivity, unless expressly indicated otherwise. These features and elements as well as the operation thereof will become more apparent in light of the following description and the accompanying drawings. It should be understood, however, the following description and drawings are intended to be exemplary in nature and non-limiting.

BRIEF DESCRIPTION OF THE DRAWINGS

Various features will become apparent to those skilled in the art from the following detailed description of the disclosed non-limiting embodiment. The drawings that accompany the detailed description can be briefly described as follows.

DETAILED DESCRIPTION

Figure 1:
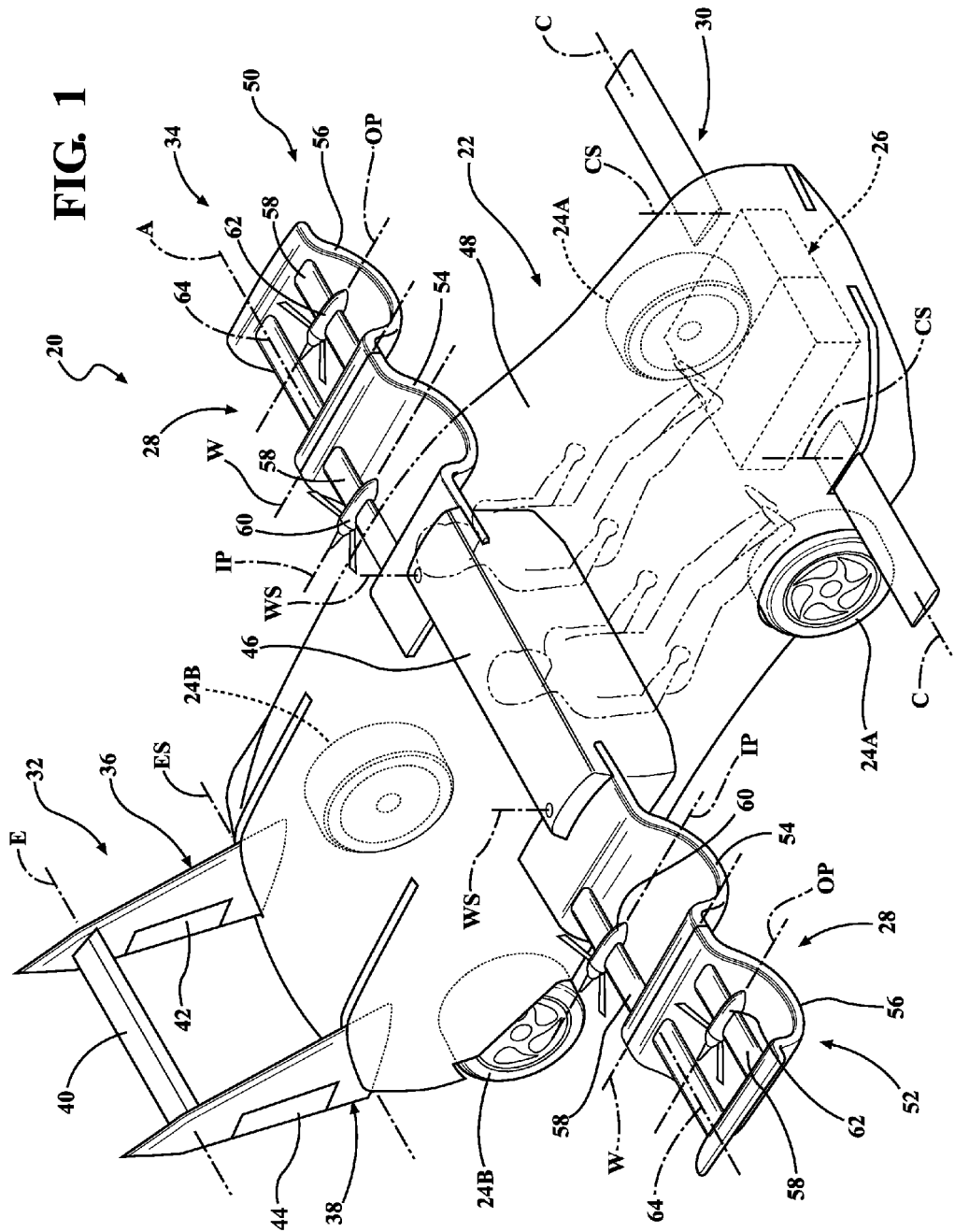
FIG. 1 is a schematic perspective view of an aerocar with a channel wing in a flight mode according to one disclosed non-limiting embodiment.
Figure 2:
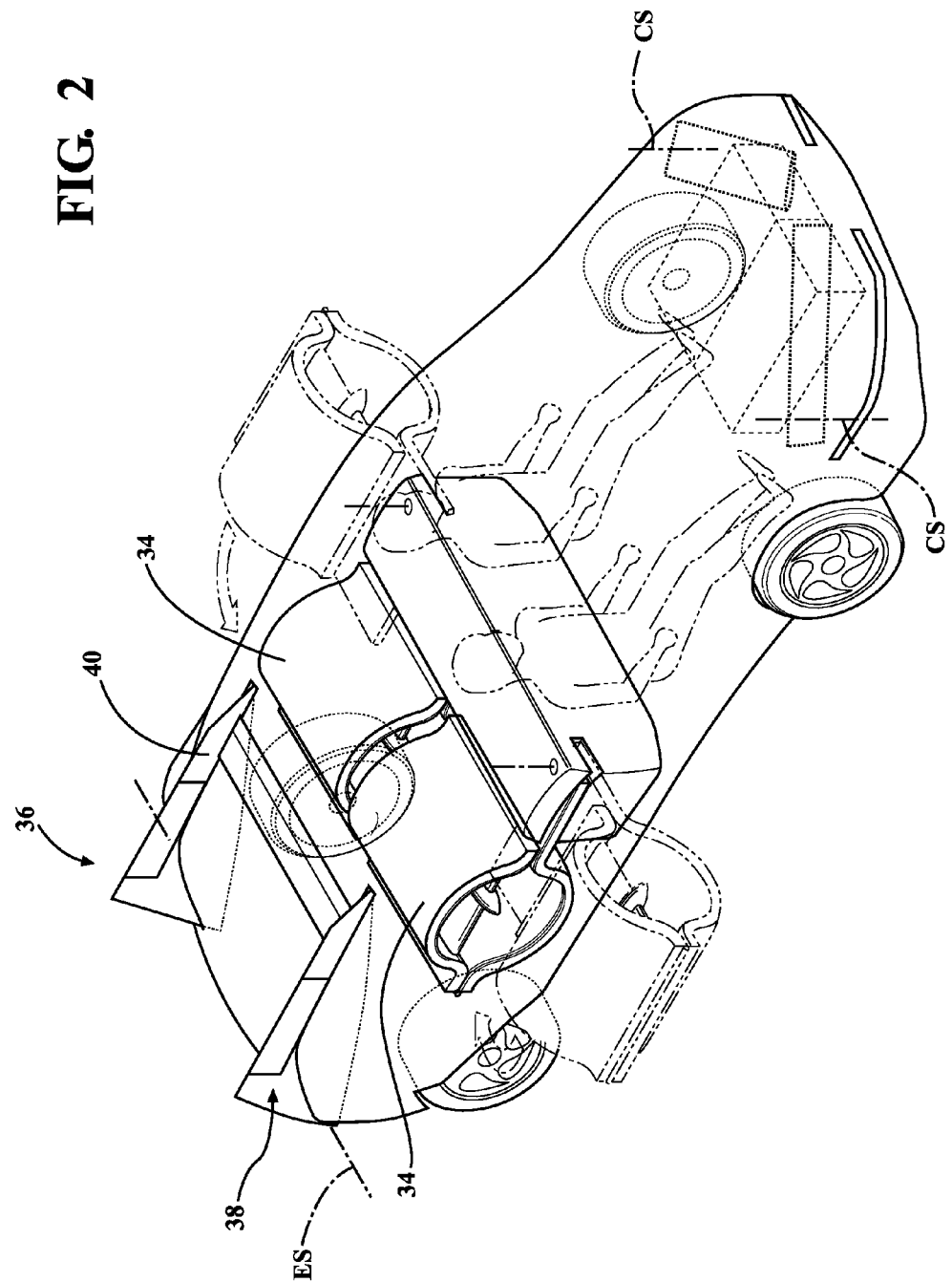
FIG. 2 is a schematic perspective view of the aerocar of FIG. 1 in a roadable mode.

FIG. 1 schematically illustrates a vehicle 20 operable in a flight mode (FIG. 1) and a roadable mode (FIG. 2). The vehicle 20 generally includes a body 22 with a multiple of wheels 24 with at least one steerable wheel 24A and at least one drive wheel 24B, a power system 26, a propulsor system 28, a canard 30, an empennage 32 and a wing system 34. It should be appreciated that although particular systems and subsystems are separately defined, each or any of the subsystems may be combined or segregated.

The body 22 provides seating for the operator, passengers and cargo. The body 22 is supported upon the multiple of wheels 24 for operations in a roadable mode (FIG. 2). The canard 30, empennage 32 and the wing system 34 are readily stowable within the body 22 to facilitate a low profile and stylish design potential when in the roadable mode that also does not interfere with the side and aft view for a driver. In one example, a wingspan of about eighteen feet is provided for a body 22 that is about six feet in width with a takeoff gross weight of about 3200 lbs. Although depicted with a particular configuration and shape in the disclosed non-limiting embodiment, it should be understood that the concepts described herein are not limited to only those illustrated.

Figure 3:
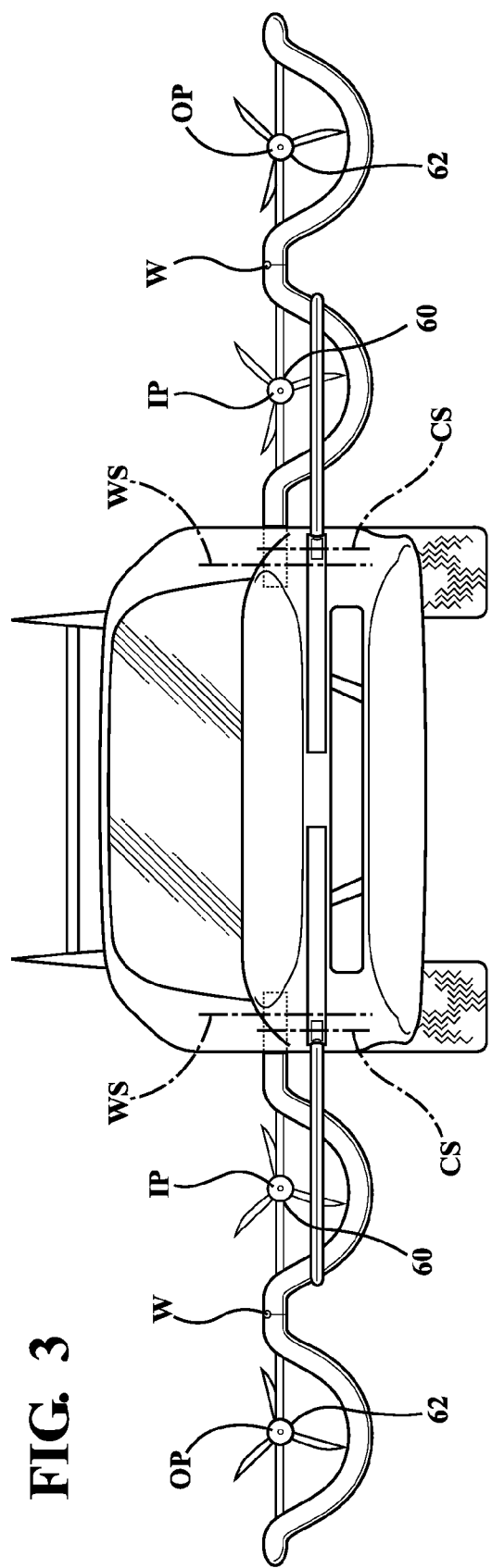
FIG. 3 is a schematic front view of the aerocar of FIG. 1 in the flight mode.

A pair of canards 30 in the disclosed non-limiting embodiment are located forward of each of the steerable wheels 24A. Each canard 30 may be an all moving surface that pitches about a respective axis C to facilitate pitch and roll control of the vehicle 20. Each canard 30 is rotatable about an axis CS (FIG. 3) for at least partial stowage within the body 22 (FIG. 2). In this disclosed non-limiting embodiment, each canard 30 is rotatable about the axis CS for a rotational distance of about one hundred and thirty-five (135) degrees between the stowed roadable mode and the deployed flight mode. It should be appreciated that other stowage arrangements such as a sliding, telescoping, or other arrangement will also benefit herefrom.

The empennage 32 generally includes a port and starboard vertical stabilizers 36, 38 with an elevator 40 therebetween. In the disclosed non-limiting embodiment, the vertical stabilizers 36, 38 each include a rudder 42, 44 to facilitate yaw control. The elevator 40 may be an all moving surface that pitches about an axis E to facilitate pitch control of the vehicle 20.

The empennage 32 is rotatable about an axis ES for stowage within the body 22 for the roadable mode. As the empennage 32 is rotated into the body 22, the elevator 40 may be pitched about its axis E to facilitate at least partial stowage into the body 22. That is, the elevator 40 may be pitched to essentially lay flat against the body 22. Alternatively, the elevator 40 may be positioned to operate as a spoiler when the vehicle 20 is in the roadable mode. It should be appreciated that other stowage arrangements such as a sliding arrangement will also benefit herefrom.

The power system 26 operates to selectively power the drive wheels 24B in the roadable mode as well as the propulsor system 28 in the flight mode. It should be appreciated that various front wheel, rear wheel and all wheel drive will benefit herefrom. The power system 26 may be of various forms to include, but not be limited to, internal combustion, gas turbine, hybrid electric, fuel cells, and other energy conversion devices.

In one disclosed non-limiting embodiment, a wing torque box structure 46 is located aft of a crew compartment 48 to provide support for the body 22, as well as for the wing system 34. The wing torque box structure 46 is located generally at the center of gravity (CG) of the vehicle 20 and may further operate as a fuel tank to store fuel. In one example, 210 liters (55 gallons) of fuel are readily stored therein. Being located at the CG, the change in fuel quantity has minimal effect upon the vehicle 20 and provides an example range of about 475 miles with a forty-five minute reserve hold.

The wing system 34 in the disclosed non-limiting embodiment includes a port wing 50 and a starboard wing 52 each of which is a dual channel wing with an inboard channel 54 and an outboard channel 56. The inboard channel 54 is defined about an inboard axis IP and the outboard channel 56 is defined about an outboard axis OP. The port wing 50 and the starboard wing 52 are mounted to the wing torque box structure 46 about an axis WS such that the outboard channel 56 extends spanwise from the inboard channel 54.

Figure 4:
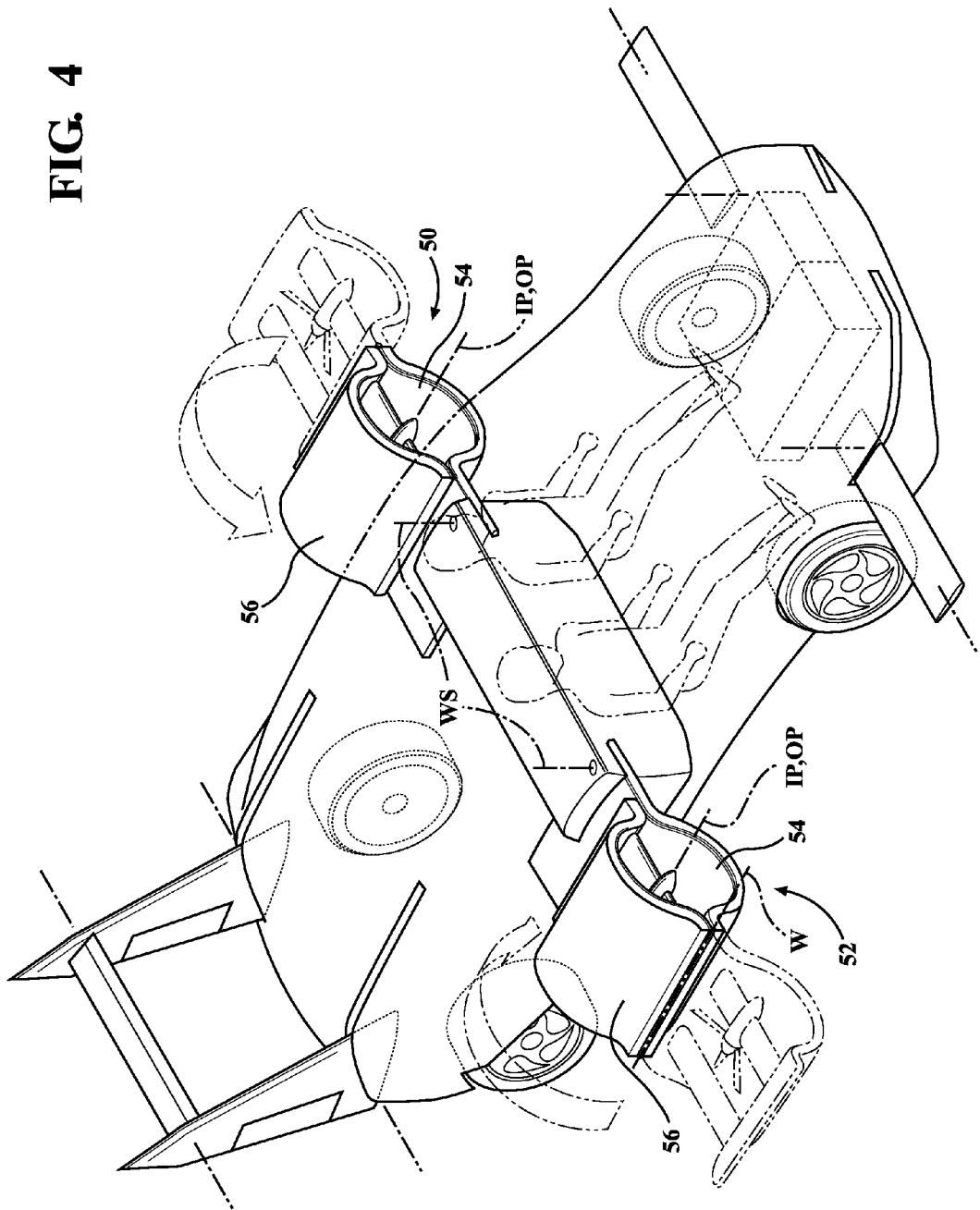
FIG. 4 is a schematic perspective view of the aerocar of FIG. 1 with the channel wing partially folded and between the flight mode and the roadable mode.

In this disclosed non-limiting embodiment, the outboard channel 56 swings about a chord axis W a distance of about 180 degrees such that the outboard channel 56 stows atop the inboard channel 54 (FIG. 4). That is, the outboard channel 56 stows atop the inboard channel 54 to essentially form a generally compact cylinder shape. Each wing 50, 52 also swings about a wing axis WS for a distance of about 180 degrees to fold between the stowed roadable mode within the body 22 and the deployed flight mode. Wing axis WS may be perpendicular to the chord axis W, or a small twist displacement may be provided, such that the outboard channel 56 stows atop the inboard channel 54 to essentially form the cylinder, then the cylinder swings about the chord axis W to stow within the body 22. It should be appreciated that other stowage arrangements such as a sliding arrangement will also benefit herefrom. It should also be appreciated that various doors (not shown) may be provided to facilitate a low profile and stylish design potential when in the roadable mode and an aerodynamically smooth surface in the flight mode.

The inboard channel 54 and the outboard channel 56 of each wing 50, 52 includes a respective strut 58 that supports a propulsor 60, 62 of the propulsor system 28. It should be appreciated that the respective strut 58 that supports a propulsor 60, 62 may be fixed in pitch or provide tilt rotor capability to facilitate thrust vectoring. Each propulsor 60, 62 may include a pusher propeller, open rotor, prop-rotor, turbofan or other thrust generation system located along the respective inboard axis IP and outboard axis OP. In one example, each propulsor 60, 62, for example a propeller driven by an electric motor generates about fifty-five (55) hp.

Each propulsor 60, 62 can be axially offset so as to not interfere when the outboard channel 56 is stowed atop the inboard channel 54. In this disclosed non-limiting embodiment, the outboard propulsor 62 is located axially forward of the inboard propulsor 60.

Aft of each outboard propulsor 62, an aileron 64 is located across the outboard channel 56 to facilitate roll and pitch control of the vehicle 20. Each aileron 64 may be an all-moving surface that pitches about an axis A to facilitate roll control of the vehicle 20. As the outboard propulsor 62 is forward of the respective aileron 64, roll control is augmented by direct airflow from the outboard propulsor 62 to provide wake enabled low-speed roll and pitch control.

Through use of the propulsor slipstream, the wing system 34 provides a significant lift coefficient and efficient downward thrust deflection without varying the high-lift configuration geometry. Such a high-lift configuration facilitates Short Takeoff and Landing (STOL) or Vertical/Short Takeoff and Landing (VSTOL) capability that provides numerous benefits associated with personal transport operating from small sites, increasingly dense urban environments, and military transport.

Figure 5:
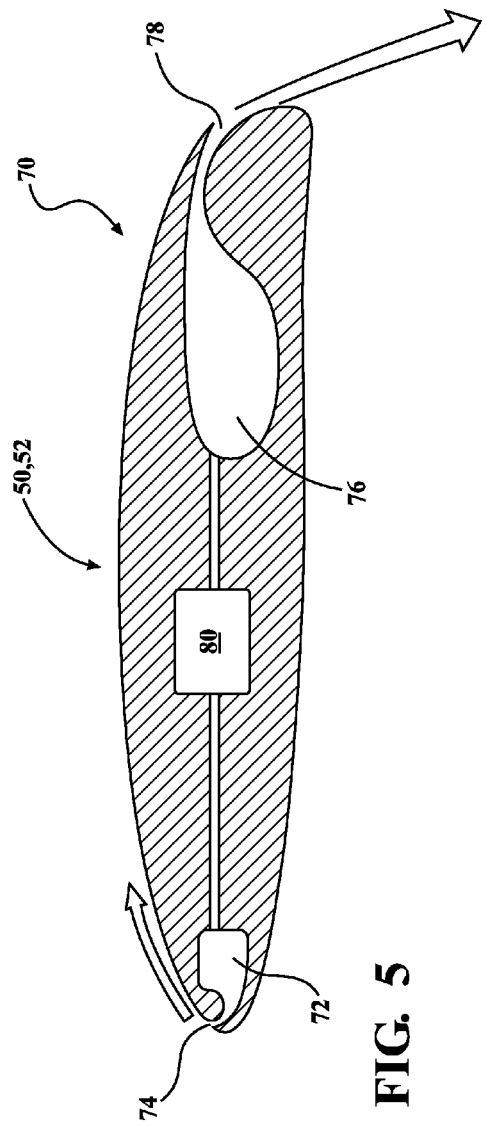
FIG. 5 is a schematic cross-sectional view of a blown channel Circulation Control Wing (CCW) for use with the aerocar of of FIG. 1 according to another disclosed non-limiting embodiment.
Figure 6:
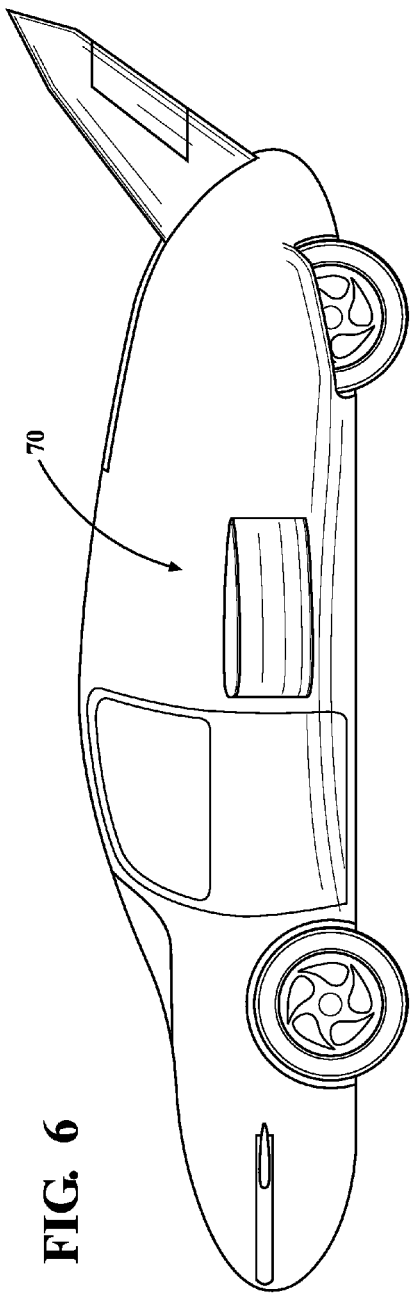
FIG. 6 is a schematic side view of the aerocar of FIG. 1 in the flight mode.

With reference to FIG. 5, in another disclosed non-limiting embodiment, each of the wings 50, 52 are blown channel Circulation Control Wings (CCW) 70 that further augment lift. It should be appreciated that various Circulation Control Wing/Upper Surface Blowing (CCW/USB) and/or boundary layer control system (BLCS) pneumatic type systems will also benefit herefrom. Lift augmentation by such pneumatic channel wing systems enables a relatively small wing area (FIG. 6). The area of such wings 50, 52 can be about 30% of that of a typical general aviation aircraft but still provide about 350%-500% of the lift augmentation of such a conventional wings with trailing edge flaps and up to 900% compared to a conventional wing without flaps.

The blown channel CCW 70 generally includes a leading edge air supply plenum 72 that feeds associated leading-edge slot(s) 74 and a trailing edge air supply plenum 76 that feeds associated trailing-edge slot(s) 78. The air supply plenums 72, 76 are connected to an air source system 80 to selectively discharge pressurized air through the slots 74, 78. The selective discharge of pressurized air through the slots 74, 78 can further facilitate STOL, VSTOL, yaw, roll, and pitch augmentation control of the vehicle 20 even at very low flight speeds as typically desired for an aerocar or roadable aircraft type vehicle.

Figure 7:
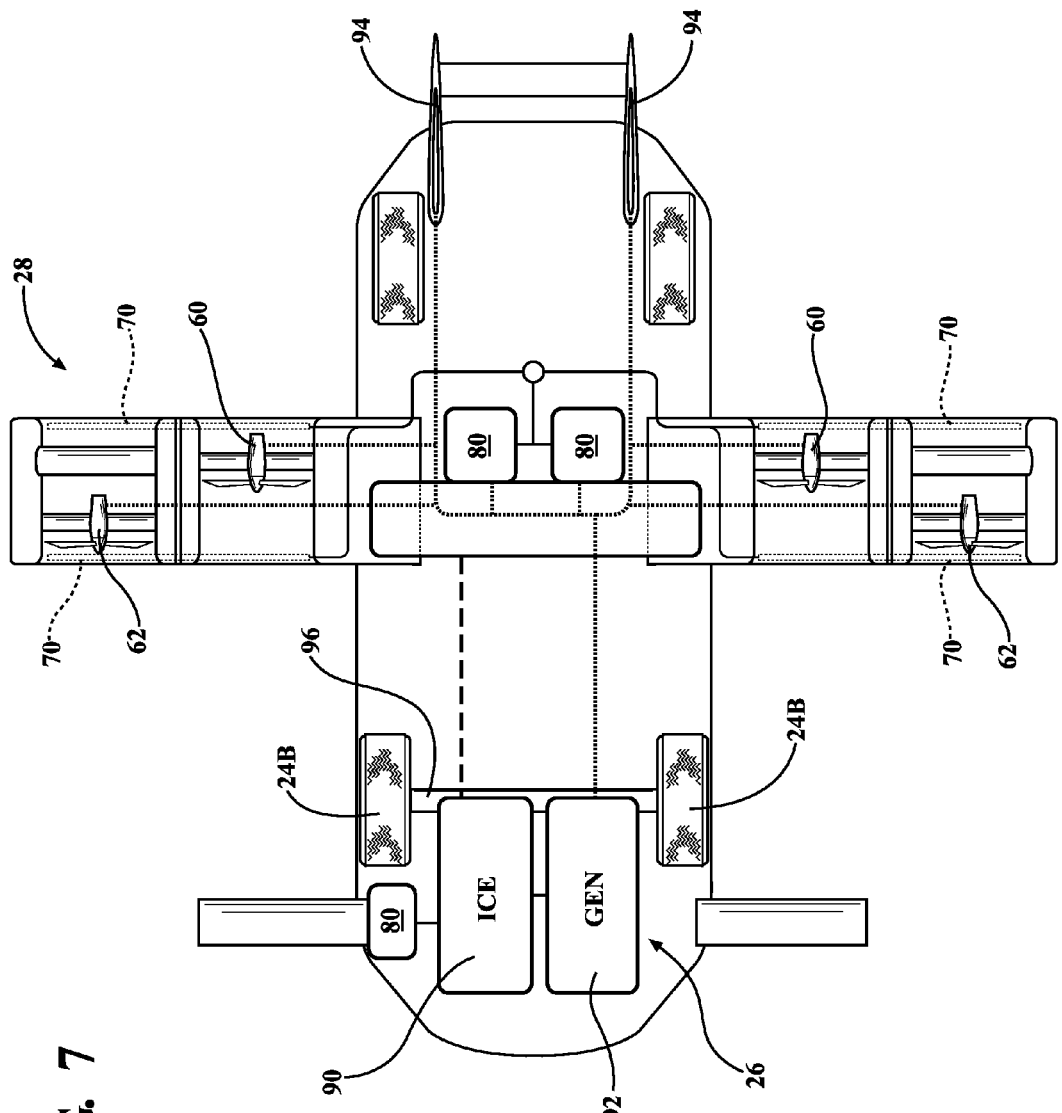
FIG. 7 is a schematic top view of the aerocar of FIG. 1 with an internal combustion engine based power system according to another disclosed non-limiting embodiment.

With reference to FIG. 7, the power system 26 in one disclosed non-limiting embodiment includes an internal combustion engine 90 that powers an electric generator 92. The internal combustion engine 90 may be supercharger or turbocharger to facilitate operations at altitude. The electric generator 92 provides electrical power in an electric distributed architecture that drives the propulsors 60, 62 of the propulsor system 28. A battery system 94 located, for example, in the port and starboard vertical stabilizer 36, 38 provides power storage to further facilitate efficient roadable and flight operations as well as fail safe operation of the electric generator 92 to power flight systems in an engine out condition. In one example, an internal combustion engine 90 of about 275 hp capacity powers the electric generator 92 to provides continuously power to the propulsors 60, 62 at cruise as well as to recharge an example battery system 94 of about 23 kWh.

The internal combustion engine 90 may power the drive wheels 24B through a shaft 96 as well as power the air source system 80. The air source system 80 may include one or more compressors to provide provides air-conditioning to the crew compartment 48 as well as high pressure air to the blown channel CCW 70.

Figure 8:
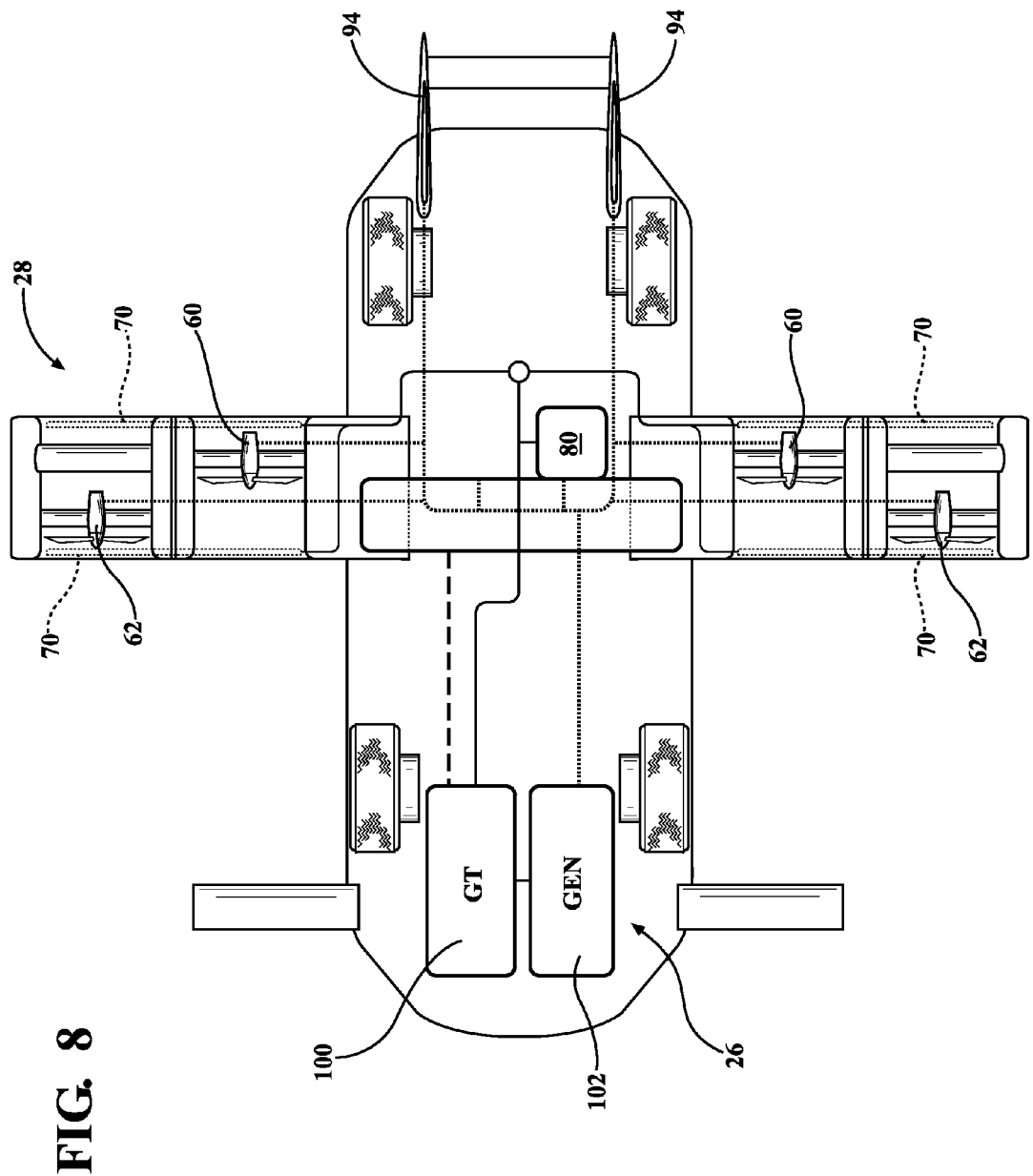
FIG. 8 is a schematic top view of the aerocar of FIG. 1 with a gas turbine engine power system according to another disclosed non-limiting embodiment.

With reference to FIG. 8, the power system 26 in another disclosed non-limiting embodiment includes a gas turbine engine 100 and an electric generator 102. The gas turbine engine 100 provides bleed air and may thereby directly supply the blown channel CCW 70 which may reduce the number of compressors as compared to the internal combustion engine embodiment. The air source system 80 may still include one or more compressors to provide air-conditioning to the crew compartment 48 and provide a fail safe supply of high pressure air to the blown channel CCW 70 should, for example, an engine out condition occurs and bleed air is unavailable.

Overall, the wing system 34 produces a reduction in wing area that facilitates wing/body integration for dual mode transition, reduces power required for cruise, and improves ride quality as the more compact wing is less sensitive to wind gust compared with a larger wing.

It should be understood that relative positional terms such as "forward," "aft," "upper," "lower," "above," "below," and the like are with reference to the normal operational attitude of the vehicle and should not be considered otherwise limiting.

Although the different non-limiting embodiments have specific illustrated components, the embodiments of this invention are not limited to those particular combinations. It is possible to use some of the components or features from any of the non-limiting embodiments in combination with features or components from any of the other non-limiting embodiments.

It should be understood that like reference numerals identify corresponding or similar elements throughout the several drawings. It should also be understood that although a particular component arrangement is disclosed in the illustrated embodiment, other arrangements will benefit herefrom.

Although particular step sequences are shown, described, and claimed, it should be understood that steps may be performed in any order, separated or combined unless otherwise indicated and will still benefit from the present disclosure.

The foregoing description is exemplary rather than defined by the limitations within. Various non-limiting embodiments are disclosed herein, however, one of ordinary skill in the art would recognize that various modifications and variations in light of the above teachings will fall within the scope of the appended claims. It is therefore to be understood that within the scope of the appended claims, the disclosure may be practiced other than as specifically described. For that reason the appended claims should be studied to determine true scope and content.

What is claimed is:

1. A wing comprising:
   an inboard portion;
   an outboard portion;
   a first channel located in the outboard portion of the wing;
   a second channel located in the inboard portion of the wing;
   a first propulsor located along an axis of the first channel;
   a second propulsor located along an axis of the second channel; and
   a control surface;
   wherein one of the first and second propulsors is located near a trailing edge of the wing and the other of the first and second propulsors is forwardly offset on the respective axis towards a leading edge of the wing; and
   wherein the control surface is located within the channel of the forwardly offset propulsor and is located downstream from the forwardly offset propulsor.

2. The wing according to claim 1, wherein the first propulsor is the propulsor that is forwardly offset and the control surface is located within the first channel; and
   wherein the control surface is an aileron.

3. The wing according to claim 1, wherein the inboard and outboard portions are arranged side-by-side along a span of the wing; and
   wherein the wing is configured to fold about a chordwise axis located between the channels such that the outboard portion is stowed atop the inboard portion in the folded configuration.

4. The wing according to claim 3, wherein the first and second channels form a tube when in the folded configuration; and
   wherein the first and second propulsors and the control surface are all located within the tube when in the folded configuration.

5. The wing according to claim 4, wherein the folded inboard and outboard portions are configured to pivot as a unit about a substantially vertical axis near a root of the wing.

6. The wing according to claim 1, further comprising:
   a blown channel circulation control wing (CCW) system.

7. The wing according to claim 6, wherein the blown channel CCW system includes:
   a leading edge air supply plenum; and
   at least one leading-edge slot;
   wherein the plenum is configured to supply the at least one slot with pressurized air; and
   wherein the at least one slot is configured to discharge the pressurized air over an upper surface of the wing.

8. The wing according to claim 7, wherein the blown channel CCW system further includes:
   a trailing edge air supply plenum; and
   at least one trailing-edge slot;
   wherein the trailing edge plenum is configured to supply the at least one trailing edge slot with pressurized air; and
   wherein the at least one trailing edge slot is configured to discharge the pressurized air downstream of the trailing edge of the wing.

9. The wing according to claim 6, wherein the blown channel CCW system further includes:
   a trailing edge air supply plenum; and
   at least one trailing-edge slot;
   wherein the trailing edge plenum is configured to supply the at least one trailing edge slot with pressurized air; and
   wherein the at least one trailing edge slot is configured to discharge the pressurized air downstream of the trailing edge of the wing.

10. The wing according to claim 1, wherein the first and second propulsors each comprise a propeller.

11. An aerocar comprising:
    at least one wing according to claim 1.

12. A dual channel wing comprising:
    an inboard channel section; and an outboard channel section;
wherein the inboard and outboard channel sections are arranged side-by-side along a span of the wing; and
wherein the wing is configured to fold about a chordwise axis located between the channel sections such that the outboard channel section is stowed atop the inboard channel section.

13. The dual channel wing according to claim 12, further comprising:
a first propeller;
a second propeller; and
an aileron;
wherein the first propeller is located along an axis of the outboard channel section and the second propeller is located along an axis of the inboard channel section;
wherein one of the first and second propellers is located towards a trailing edge of the wing and the other of the first and second propellers is forwardly offset on its respective axis towards a leading edge of the wing; and
wherein the aileron is located within the channel of the forwardly offset propeller and is located downstream from the forwardly offset propeller.

14. An aerocar comprising:
a fuselage; and
at least one dual channel wing according to claim 13;
wherein the at least one dual channel wing is connected to the fuselage.

15. The aerocar according to claim 14, wherein the folded inboard and outboard sections are configured to pivot as a unit about a substantially vertical axis near a root of the at least one wing so as to be stowed substantially within a width dimension of the fuselage.

16. The dual channel wing according to claim 12, further comprising:
a blown channel circulation control wing (CCW) system;
wherein the blown channel CCW system includes:
a leading edge air supply plenum; and
at least one leading-edge slot;
wherein the plenum is configured to supply the at least one slot with pressurized air; and
wherein the at least one slot is configured to discharge the pressurized air over an upper surface of the at least one wing.

17. The dual channel wing according to claim 16, wherein the blown channel CCW system further includes:
a trailing edge air supply plenum; and
at least one trailing-edge slot;
wherein the trailing edge plenum is configured to supply the at least one trailing edge slot with pressurized air; and
wherein the at least one trailing edge slot is configured to discharge the pressurized air downstream of a trailing edge of the at least one wing.

18. The dual channel wing according to claim 12, further comprising:
a blown channel circulation control wing (CCW) system;
wherein the blown channel CCW system further includes:
a trailing edge air supply plenum; and
at least one trailing-edge slot;
wherein the trailing edge plenum is configured to supply the at least one trailing edge slot with pressurized air; and
wherein the at least one trailing edge slot is configured to discharge the pressurized air downstream of a trailing edge of the at least one wing.

19. A method of stowing and deploying at least one dual channel wing on an aerocar, the method comprising:
providing an aircraft comprising:
a fuselage; and
at least one dual channel wing;
wherein the at least one dual channel wing comprises:
an inboard channel section; and
an outboard channel section;
wherein the inboard and outboard channel sections are arranged side-by-side along the span of the at least one wing;
wherein the at least one wing is configured to fold about a chordwise axis such that the outboard channel section is stowed atop the inboard channel section;
swinging the outboard channel section about the chordwise axis such that the outboard channel section stows atop the inboard channel section to place the channel sections in a stowed state; and
swinging the outboard channel section, from the stowed state, about the chordwise axis such that the outboard channel section and the inboard channel section are unfolded and arranged side-by-side to place the channel sections in a deployed state.

20. The method of stowing and deploying a dual channel wing according to claim 19, wherein, when folded, the inboard and outboard sections are configured to pivot as a unit about a substantially vertical axis near a root of the at least one wing, and the method further comprising:
pivoting the folded inboard and outboard sections as a unit about the substantially vertical axis such that the at least one wing is located substantially within a width dimension of the fuselage to place the at least one wing in a stowed state; and
pivoting the at least one stowed wing from substantially within the width dimensions of the fuselage about the substantially vertical axis prior to unfolding the channel sections into a deployed state.

* * * * *